United States Patent Office 3,827,989
Patented Aug. 6, 1974

3,827,989
IMPREGNATED CHEMICAL SEPARATION PARTICLES
Charles D. Scott, Oak Ridge, Tenn., assignor to the United States of America as represented by the United States Atomic Energy Commission
Filed Nov. 13, 1972, Ser. No. 306,062
Int. Cl. C08f 33/08
U.S. Cl. 260—2.1 E                    5 Claims

ABSTRACT OF THE DISCLOSURE

Particles, such as ion exchange and selective sorbents useful in chemical separation processes, having a continuous phase throughout the entire particle and an impermeable impregnant in the central portion of the particle, and a method for producing the particle.

BACKGROUND OF THE INVENTION

This invention was made in the course of, or under, a contract with the United States Atomic Energy Commission. It relates generally to a new particle useful in chemical separation processes and more particularly to ion exchange resin and selective sorption particles having an impregnated impermeable central portion and to a method for producing the same.

Various particles with selective sorption and ion exchange characteristics have been used in chemical and biochemical separation processes. Ion exchange particles have heretofore been used generally in the form of porous spheroidal particles. When using conventional particles in a separation process, the species, which are being separated, diffuse to the absolute center of the particles. Since the absolute center of a particle represents the point of maximum distance from the surface of the particle, this distance corresponds to the longest diffusion path in the separation process. The time taken for this diffusion step is frequently the rate controlling step of the process. Not only can this step be rate controlling, but the resolution, i.e., the degree of separation, achieved in the process is dependent upon the lengths of the diffusion paths. Conventional spheroidal particles thus present a problem which is two-fold; i.e., (1) long diffusion paths which cause the process time to be long, and (2) poor resolution between the species being separated because of the lengths of the diffusion paths.

One prior art attempt to overcome these problems involved the use of very small particles so as to minimize the distance from the absolute center of the particle to the surface. Ion exchange particles have been used in sizes as small as 10 microns. However, this technique, while helpful, causes a large pressure drop through the length of an ion exchange column. Fluids which are being placed into the column must be pumped under sufficient pressure to overcome the resistance to flow presented by the small particles. The column equipment as well as the particles themselves must be able to withstand the pressures needed to produce flow through the column. In many instances this is impracticable.

Another prior art technique involved the use of particles formed of an inert central portion covered with a layer of ion exchange resin. One example of this is a glass bead covered with a layer of an ion exchange resin. This technique is operable in solving the problems presented by the long diffusion path to the center of the particle as well as eliminating the necessity of using small particles. However, these particles have rather short life spans because the outer resin portion tends to spall off of the central inert portion as a result of thermal cycling and changes in chemical properties to which ion exchange resins are subjected during operational and non-operational conditions.

SUMMARY OF THE INVENTION

It is thus an object of this invention to provide a new particle useful in chemical separation processes which has a continuous phase throughout the entire particle but which has diffusion paths only in the surface regions thereof.

It is another object of this invention to provide a particle of the above character which will not spall during thermal and chemical cycling.

It is a further object of this invention to provide a method for producing particles of the above character.

These and other objects are accomplished by impregnating conventional chemical separation particles with a hardenable material which is impermeable to fluids used in a separation process and then removing the hardenable material from the outer portion of the particle.

DETAILED DESCRIPTION

According to this invention chemical separation particles are provided with a continuous phase throughout the entire volume of the particle and an impermeable impregnant in the central portion thereof.

Particles of various materials are used in chemical and biochemical separation processes. As used within this specification the term "particles useful in chemical separation processes" means those materials which exhibit ion exchange properties and those materials which exhibit selective sorption properties. Ion exchange materials include the commonly used ion exchange resins comprised of styrene and crosslinked with divinyl benzene to which various functional groups are attached. Other ion exchange materials have epoxy-polyamine, phenolic and acrylic lattices. Selective sorbent materials include silica, zirconia, hydroxylapatite, and alumina. These materials come in various shapes and sizes. Preferably the particles are in the form of spheres or spheroids. However, this invention is applicable to particles of irregular shape as well as the preferred shape. These particles are available in diameters from about 10 microns up to about a millimeter.

According to this invention conventional chemical separation particles are first totally impregnated throughout the entire volume with a hardenable material. The thus impregnated particles are treated to remove the hardenable material from surface portions of the particle while leaving the impregnant in the central portion. The spheroids may be treated either before or after the hardenable material has hardened. However, in the preferred embodiment of this invention, the hardenable material is removed prior to hardening. Since particles used in chemical separation processes are normally porous, it is preferred to impregnate the spheroids with a dense form of the same material from which the particle is made.

Figure 1:
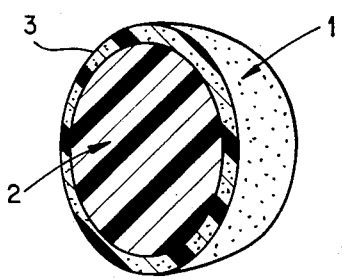
FIG. 1 is a sectional view of a chemical separation particle of this invention.

A cross section view of a particle (1) of this invention appears in FIG. 1. The particle comprises an impermeable impregnated portion (2) surrounded by a functional porous region (3). Preferably the particle has a functional outer portion (3) which is about 10% of the radius of the particle. However, the degree of impregnation will vary with the particular particles, the diameter of the particles, and with the particular application intended for the particles. In general, the particles may have an outer functional layer which is about 10 to 20% of the radius of the particle.

Any of the conventional ion exchange resins, both anion and cation, are applicable for use with this invention as well as the selective sorbents mentioned above. Divinyl benzene or stearic acid are the preferred impregnants for these materials. However, any hardenable material may be used as an impregnant. Either temperature or chemically hardenable materials are suitable for use with this invention. The particles may also be impregnated by chemically precipitation liquid impregnants, such as by impregnating the particles with a silver nitrate solution and then chemically precipitating silver chloride in situ.

Impregnation may be achieved in any well known manner. Preferably impregnation is achieved by merely soaking the particles in the impregnant either with or without stirring. However, it is important to exclude all gases from the particles prior to contacting with the impregnant so as not to impede the movement of the impregnant into vacuum on the particles prior to contacting.

In the case of ion exchange resins, it is preferred to impregnate the resins particle with one of the polymerizing agents from which the particle is made and to remove some of the impregnant by dissolving it from the surface of the particle prior to polymerizing the impregnant. One of the most used classes of ion exchange resins is composed of styrene crosslinked with divinyl benzene. For this class of resins it is preferred to impregnate the resins with divinyl benzene and a polymerization catalyst. The divinyl benzene is easily removed from the surface of the particle prior to polymerization by contacting the impregnated particle with a hydrocarbon solvent. After partially removing the divinyl benzene, the particles are heated to promote polymerization of the impregnant and thus render the central portion impermeable.

The degree of impregnant removal is controlled by the length of time that the impregnated particle is contacted with a solvent. Usually about 15 to 30 seconds with a hydrocarbon solvent, such as methanol or benzene, will remove the impregnant from the outer 10 to 20% of the particle radius. The contact time will, of course, vary for different systems but the optimum time for such systems can be readily determined by those familiar with the art.

In order to further illustrate the invention the following nonlimiting examples are given.

EXAMPLE I

Twenty grams of "Dowex" 1 x 8 (polystyrene with 8% divinyl benzene and a trimethyl benzyl ammonium active group) anion exchange resin beads of 20±5 microns diameter were contacted by stirring with about 10 grams of divinyl benzene with 1 wt. percent benzyl peroxide polymerization catalyst under vacuum at 25° C. until complete penetration was achieved (about 1 hour). Excess divinyl benzene was removed by filtration. The thus impregnated beads were contacted with methanol for about 20 seconds while mildly agitating. The beads were removed from the methanol, dried and heated to 85° C. in a nitrogen atmosphere for 15 minutes to polymerize the divinyl benzene. The resulting ion exchange beads had an impermeable interior portion and a surface active portion of about 10% of the bead radius. Particles produced by this process were temperature cycled within the range of 25 to 60° C. and chemically cycled with 0.01 to 6 molar acetate buffer, pH 4.4. No degradation of the particles was observed.

EXAMPLE II

A reference solution containing five urinary constituents was used to evaluate the "Dowex" 1 x 8 core-filled resin beads produced according to the conditions given in Example I. The reference solution contained the following constituents which correspond to the peak reference numerals shown in FIGS. 2, 3 and 4:

trigonelline (4)
pseudouridine (5)
uracil (6)
N-methyl-2-pyridine-5-carboxamide (7)
7-methyl xanthine (8)

Figure 2:
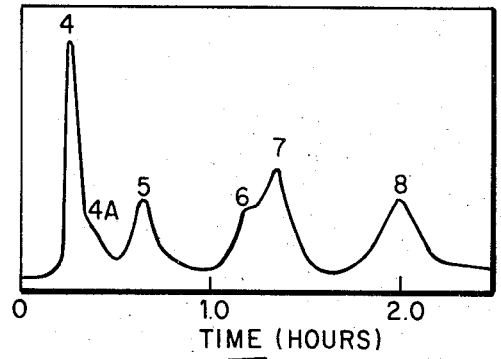
FIG. 2 is a chromatogram of urinary constituents produced using conventional ion exchange resin particles of 20 to 40 microns in diameter.
Figure 3:
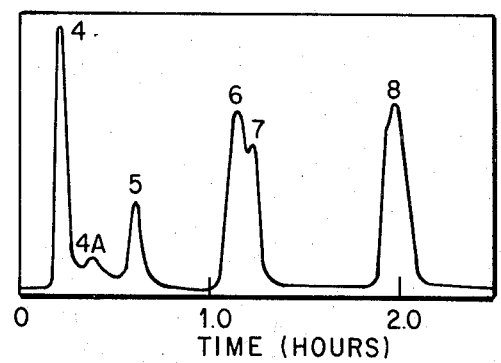
FIG. 3 is a chromatogram of the same urinary constituents shown in FIG. 2 using conventional ion exchange resin particles of 12 to 15 microns in diameter.
Figure 4:
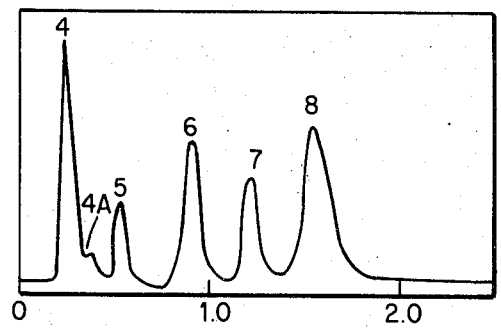
FIG. 4 is a chromatogram of the same urinary constituents shown in FIGS. 2 and 3 using ion exchange particles of this invention 20 to 40 microns in diameter.

A high pressure liquid chromatograph was used for the evaluation. It included a high pressure pump for operation up to 3000 p.s.i.; a stainless steel column 150 x 0.22-cm.; a flow uv-photometer with monitoring at 254 and 280 nm.; and necessary timers and eluent gradient generation equipment. Using the same elution conditions (25° C., 13.5 ml./hr. eluent rate, and acetate buffer concentration varying from 0.015 to about 0.5 M in 3 hours) three types of sorbents were used. First, resin beads 20–40μ in diameter were used and in 2½ hours resolution of the five components was not quite complete (FIG. 2). Then, resin particles 12–15μ in diameter were used. Resolution was better but still not complete for the components eluting 6 and 7 (FIG. 3). Finally, core-filled resin beads (20–40μ diam.), produced according to Example I, were used and complete resolution was achieved in less than two hours (FIG. 4).

As is seen in Example II the particles of this invention show surprising superior properties. The particles of this invention not only produce better resolution than smaller particles, but also produce a significantly faster and better resolved separation than particles of comparable size.

What is claimed is:

1. An ion exchange resin particle useful in chemical separation processes, comprising:
   a continuous phase throughout the entire volume of said particle; and
   an impermeable impregnant only in the central portion of said particle;
wherein said continuous phase is styrene crosslinked with divinyl benzene and said impermeable impregnant is polymerized divinyl benzene.

2. The ion exchange resin particle according to claim 1 wherein the functional group of said ion exchange resin is trimethyl benzyl ammonium.

3. The particle according to claim 1 wherein the radial distance from the surface of said particle to said impregnant is about 10 to 20% of the radius of said particle.

4. A method for producing a particle useful in chemical separation processes, comprising the steps of:
   impregnating a styrene divinyl benzene copolymer ion exchange resin particle with divinyl benzene and a polymerization catalyst;
   removing said divinyl benzene from the surface portion of said resin particle; and
   polymerizing the remaining divinyl benzene within said resin particle to form an impermeable central portion within said resin particle and to retain a permeable surface portion.

5. The method according to claim 4 wherein the functional group of said ion exchange resin is trimethyl benzyl ammonium.

References Cited

UNITED STATES PATENTS 3,252,921   5/1966   Hansen et al.
3,489,699   1/1970   Battaerd.

MELVIN GOLDSTEIN, Primary Examiner

U.S. Cl. X.R.

260—2.2 R